W. P. BETTENDORF, DEC'D.
J. W. BETTENDORF, ADMINISTRATOR.
CONVERTIBLE FLAT BOTTOM FREIGHT CAR AND DUMP CAR.
APPLICATION FILED OCT. 26, 1910.
1,056,490.
Patented Mar. 18, 1913.
4 SHEETS—SHEET 1.
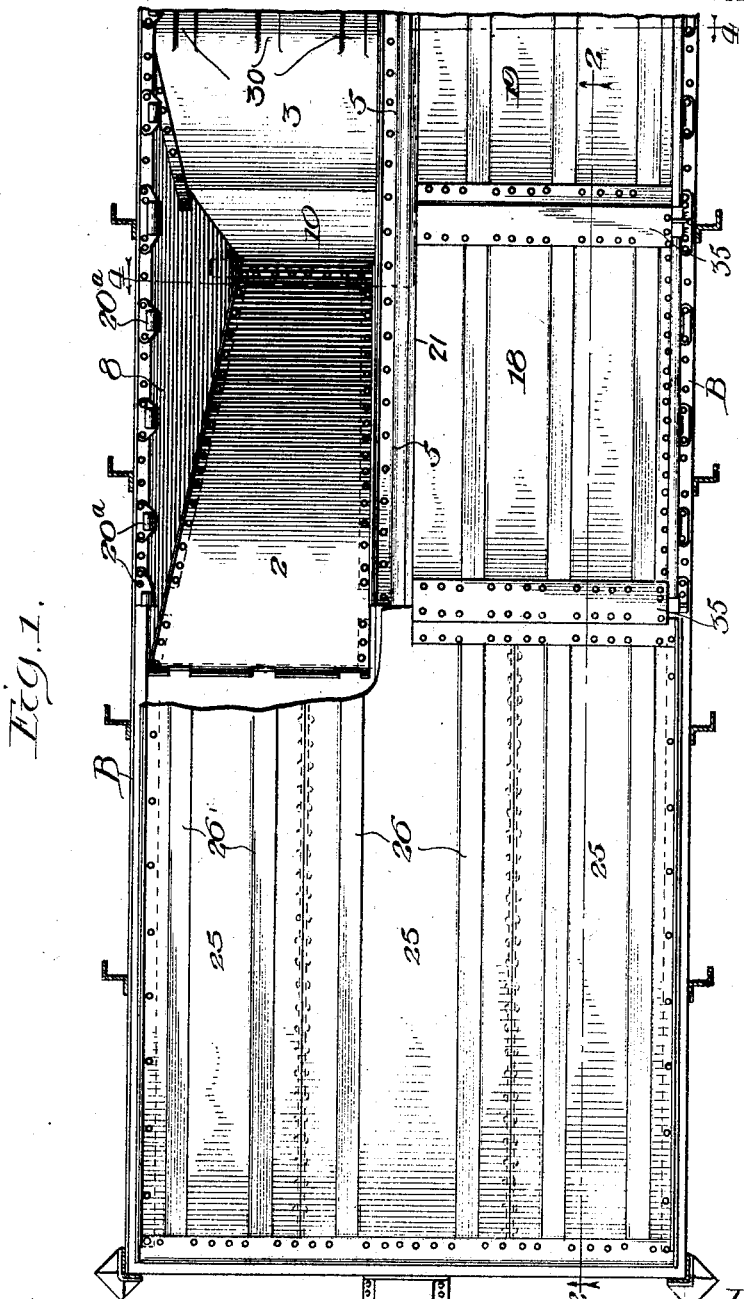

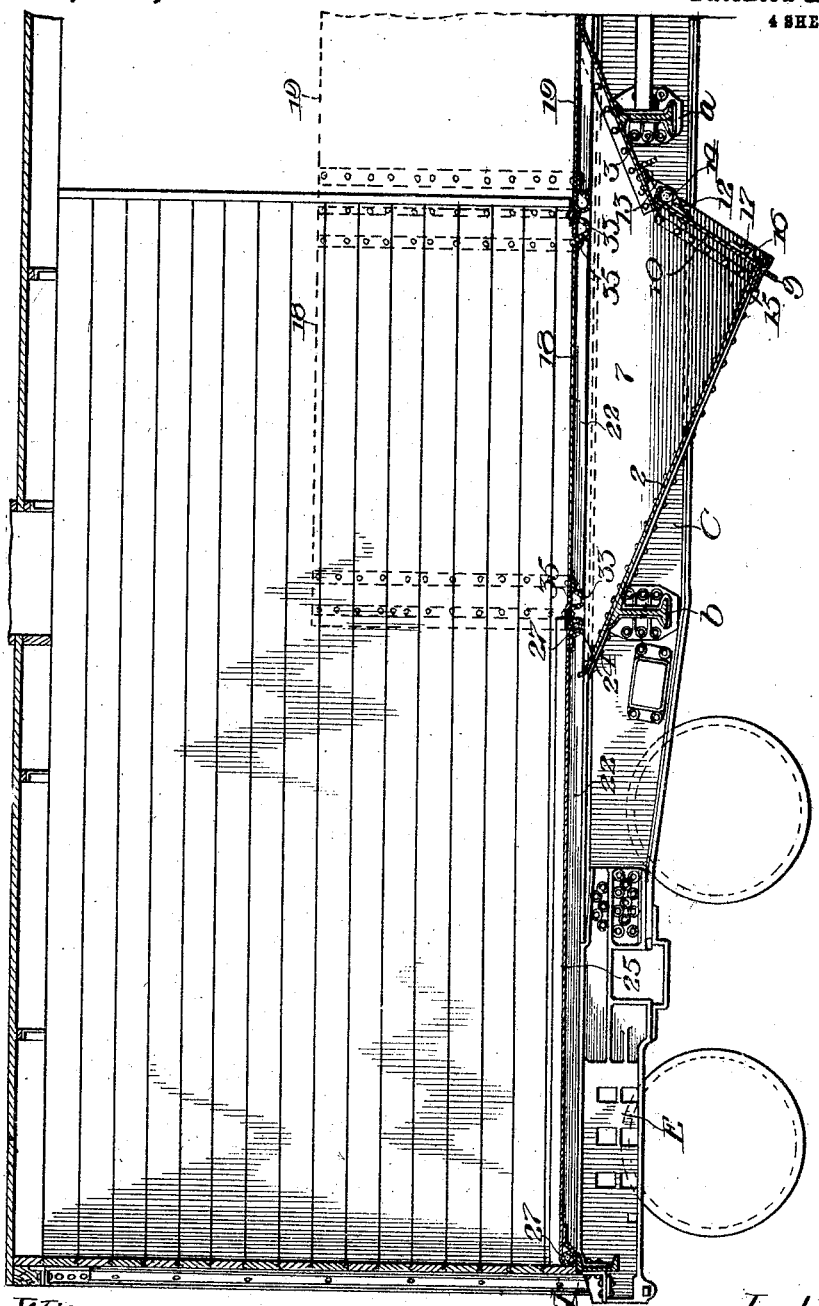

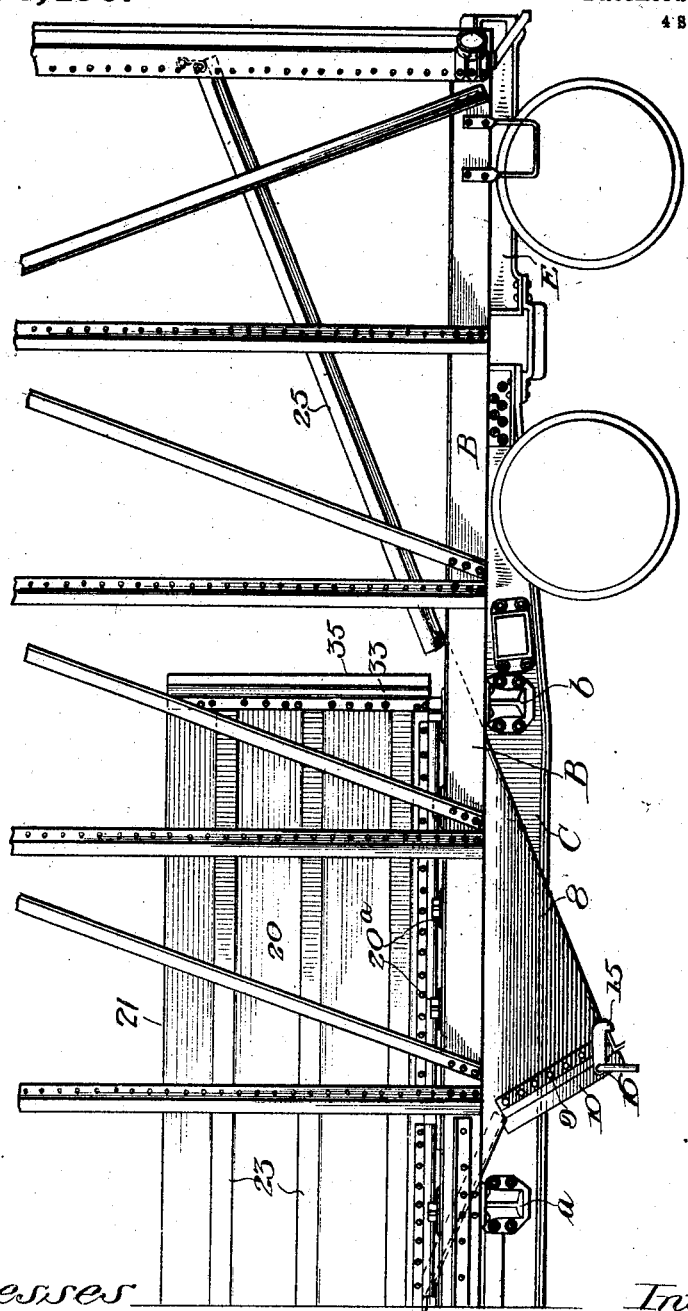

W. P. BETTENDORF, DEC'D.
J. W. BETTENDORF, ADMINISTRATOR.
CONVERTIBLE FLAT BOTTOM FREIGHT CAR AND DUMP CAR.
APPLICATION FILED OCT. 26, 1910.
1,056,490.
Patented Mar. 18, 1913.
4 SHEETS—SHEET 4.
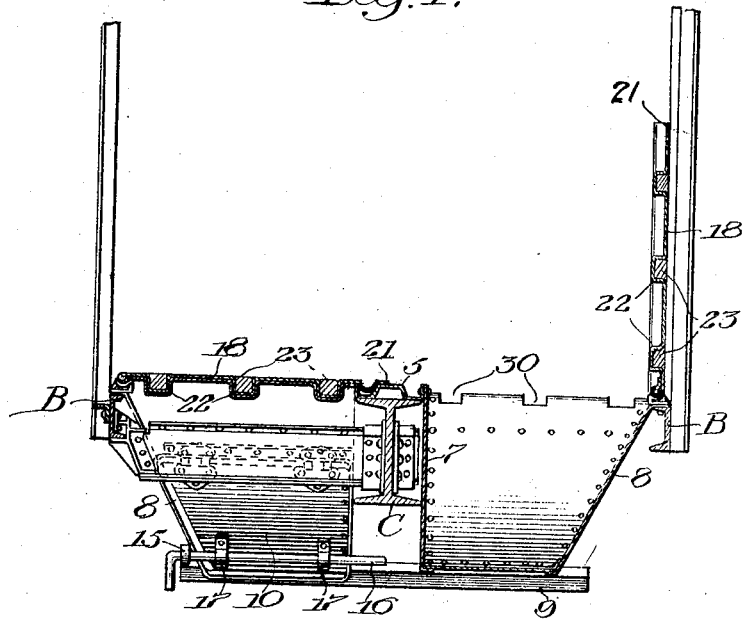
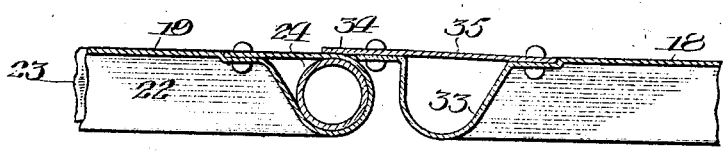
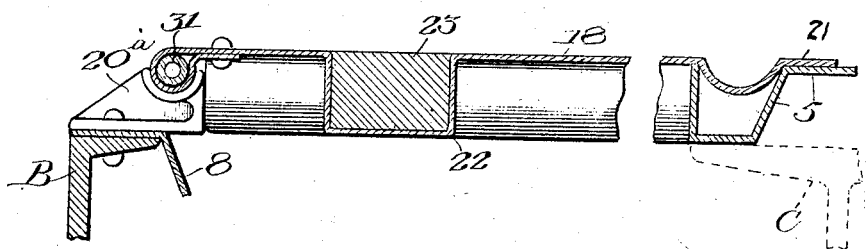

UNITED STATES PATENT OFFICE.

WILLIAM P. BETTENDORF, DECEASED, LATE OF BETTENDORF, IOWA, BY JOSEPH W. BETTENDORF, ADMINISTRATOR, OF DAVENPORT, IOWA.

CONVERTIBLE FLAT-BOTTOM FREIGHT-CAR AND DUMP-CAR.

1,056,490.  Specification of Letters Patent.  Patented Mar. 18, 1913.

Application filed October 26, 1910. Serial No. 589,096.

*To all whom it may concern:*

Be it known that WILLIAM P. BETTENDORF, deceased, late a citizen of the United States, residing at Bettendorf, in the county of Scott and State of Iowa, did invent certain new and useful Improvements in Convertible Flat-Bottom Freight-Cars and Dump-Cars, of which the following is a full, clear, and exact description.

This invention relates to freight cars which are adapted to be converted from flat-floored cars into hopper-bottomed cars, or vice versa.

At present, the railroads are subjected to great expense in returning cars empty from their original destinations back to their points of original shipment. This is due to a very great extent to the fact that cars are usually built to carry only a certain general class of commodity, and are unsuitable for carrying other classes. For example, the hopper-bottomed cars which are used to carry grain from the northern and western countries to the eastern markets, are not adapted to carry back machinery, lumber, package freight produced principally in the East, and other commodities for which there is such a great demand and such a limited supply in grain raising communities. If, however, these hopper-bottomed grain-cars could be expeditiously and economically converted into regular flat-bottomed cars, of the box-car type, they would then be available for transporting freight of almost any description, and could be kept in constant profitable service.

The object of this invention is to accomplish this conversion quickly and economically by ordinary labor without the assistance of special devices, machinery or facilities.

Another object is to avoid the necessity of employing more than one set of floor elements for the end portions of both kinds of cars, and otherwise to greatly simplify and cheapen the construction of this kind of car. And still another object is to adopt an all-metal construction for this kind of a car in so far as the part thereof including its floor and under frame are concerned.

These objects are accomplished by the means hereinafter fully described, and as particularly pointed out in the claims.

In the drawings: Figure 1 is a plan view of a portion of a convertible freight and dump-car embodying this invention showing the studding in section. Fig. 2 is a vertical longitudinal section of about one-half of said car, taken on dotted line 2, 2, Fig. 1. Fig. 3 is a side elevation of the remaining half of the car with the siding and roof of the body thereof removed. Fig. 4 is a transverse vertical section taken on dotted line 4, 4, Fig. 1. Figs. 5 and 6 are detail views showing in section fragments of the edges of the covers or doors of the hoppers.

Generally speaking, this invention consists of a combination dump-car and freight-car, the superstructure of which may be of any of the standard box-car types, but the floor of which is made of sections, some of which serve as doors for the hoppers, built so that by proper manipulation it may be made either flat throughout the length of the car, or changed to slope or incline from each end toward the center of the same and discharge into the hoppers that are arranged on each side of the center of its length and on either side of the center-sill thereof.

The underframe of the car is, in its essentials, the same as that shown in said William P. Bettendorf's application for Letters Patent, now pending in the United States Patent Office, and filed March 13, 1908, Serial No. 362,176, and consists of channel-shaped end-sills, A, channel-shaped side-sills B, B, and a single center-sill C, which terminates between and has its ends adjacent to the body-bolsters (not shown). The center-sill, C, consists of an I-beam, which has the top of its flanges in the same horizontal plane as the top of the upper flanges of the channel iron side-sills, but it is considerably heavier and deeper than the latter; and, preferably, has its ends reduced in any suitable manner. The rear ends of the parallel cast-metal draft-sills E, arch over the bolsters and fit snugly between the upper and lower flanges of the ends of the center-sill, and embrace and are securely fastened to the web thereof. The side-sills are connected by needle-beams a, consisting of continuous I-beams that are secured to and extend from side-sill to side-sill through openings made in the web of the center-sill. These needle-beams are preferably located an equal distance in front of and to the rear of the center of length of the car, and by referring to the drawings it will be observed that their upper flanges are inclined to ward the car ends. Said side-sills are also connected by similar needle-beams $b$, $b$, situated between needle-beams $a$ and the body-bolsters, preferably, located farther away from the center of the car, about in the transverse plane of the point where the reduction of the ends of the center-sill commence.

The hoppers of the car are arranged in pairs; one pair in front of the center of length of the car and the other to the rear thereof, and are about ten feet in length. The bottoms 2 of the portions of these hoppers nearest the bolsters incline downward longitudinally from a point slightly above the plane of the upper edge of the center-sill, in a transverse plane near that of needle-beams $b$, and extend over and are supported upon the inclined upper flanges of said needle-beams, and terminate within about four feet of the center of the car, and about a foot above the rails. The ends of these hoppers opposite the top of the inclined bottoms 2 terminate at the center of the car, and it is preferable to use one strip of sheet metal for the bottoms 3, 3, of the alining hoppers located on the same side of the center-sill. This is accomplished by bending said sheet metal plate so that its center of length will constitute a transverse ridge which will be in the horizontal plane of the surface of the cap-plate, 5, and shed downward to its lower edge, which is about three feet from the center of the car in a horizontal plane intersecting the needle-beams above their lower flanges. The lower edge of the longer inclined bottom portion, 2, constitutes the lower edge of the discharge-opening of the hopper, and the lower edges of the floor portion, 3, forms the upper edge thereof. Now the cap-plate 5, consists of a channeled shaped strip of sheet metal, the central portion of which is raised to make a longitudinal plateau. This cap-plate is secured to the upper edge of the center-sill in any suitable manner and extends from a point above one needle-beam $b$, to the other needle-beam $b$. The walls 7 of the hoppers next the center-sill are vertical; their upper edges are riveted or otherwise secured to the upturned flanges of the longitudinal edges of the cap-plate, and their lower edges are flanged outward and the bottom plates of the hopper rest upon said flanged edges and are riveted or otherwise secured thereto.

The outer walls 8 of the hoppers have their upper edges flanged outward and secured to the upper flanges of the channel beam side-sills B, and incline downward therefrom and have their lower edges flanged inward and the bottom plates of the hopper resting upon and riveted thereto.

The vertically disposed edges of the discharge-openings of the hoppers, and also the lower edges are reinforced, preferably, by metal strips 9, and these discharge-openings are closed by doors 10. Each of these doors consists of a plate of sheet metal of the trapezoidal shape of the discharge-opening, and have their edges flanged outward, and each is hinged by means of suitable knuckle plates 12, riveted to their outer surfaces near their upper edges, and companion knuckle-plates 13, secured to the under surface of the bottom portion 3 of the hopper, through the medium of a pintle-bolt, 14, substantially as shown in the drawings. When said doors are closed they can be kept closed by means of dogs, 15, 15, that are secured to the ends of a transverse rock-shaft, 16, journaled near the lower edge of the door in bearings 17, secured to the outer surfaces thereof. The outer end of shaft 16 is bent at right angles thereto to afford a handle with which to rock it, and the inner dogs, 15, and the outer dogs are adapted to catch over the contiguous projecting ends of the metal reinforcing strips 9.

The mouths or openings into the hoppers are rectangular, and if the transverse ridge separating the two alining hoppers on the same side of the center-sill be excepted, the openings extend from the end of one hopper nearest the bolster to the opposite end of the alining hopper near the opposite bolster. The hoppers on the same side of the car are closed, when it is desired to convert the same into a flat-bottomed car, by three doors or covers, 18, 19 and 20. The central door, 19, is made of one or more sheet metal plates, and is of such rectangular dimensions as to cover the space between the side-sills and the center-sill, and so as to lap over the latter, and it is of such length as to extend from the transverse vertical plane of the lower edge of the bottom 3 of one hopper, to the transverse vertical plane of the lower edge of bottom 3 of the alining hopper. The doors 18 and 20 are also made of one or more plates of sheet metal and cover an equal rectangular area that doors 19 do, and are of such length as to extend from the vertical transverse plane of the needle-beam $a$, to the adjacent transverse edge of the central door 19. The longitudinal edges of these doors adjacent to the side-sills are rolled back upon themselves and a rod filler 31 is inserted in the bore of the tube thus formed and these edges are pivoted in open bearing blocks, 20ª, supported upon and secured to the upper flanges of the side-sills. The opposite longitudinal edges 21, of said doors lap over the side-flanges of the cap-plate and terminate and rest upon the central raised portion of the same, and between said central raised portion and the side flanges of the cap-plate, they are guttered or dipped downward. Between their longitudinal edges, all of these doors are provided with longitudinal corrugations 22 that extend almost, but not quite, from end to end thereof, and these corrugations have wooden strips 23 seated therein. In order to accommodate the corrugations of doors 19, the transverse ridge of the bottoms 3 of alining hoppers are provided with longitudinal channels 30, 30, into which corrugations 22 of door 19 enter when the door is shut. The transverse edges of the doors are rolled back upon themselves and riveted to form tubular edges 24, and the rolled back edges over-lap the ends of the strips of wood and confine the same in place. The transverse edges of the doors 18 and 20, are provided with gutters 33, and the inner margins of these gutters are depressed and the outer edges flanged outward, and a flat metal reinforcing strip 35 is riveted to said depressed marginal surface and to said flanged edges and covers over the guttered portion and make a transverse tubular edge for said doors that are strong and inflexible, and are provided with a lip 34 which, when said doors are all closed, will lap over the adjacent edges of the door 19, on one side thereof and over the floor sections of the car on the other side. When these doors are raised, to convert the car into a dump-car, they are secured to the side-walls of the body of the car in their raised position by any suitable means, say, a hook or chain, and when in this raised position the middle sections will swing up directly across the side door openings of the car and thus be made to perform the duty of grain or coal doors.

The floor of the car between the ends thereof and transverse vertical planes of the needle-beams b, consists of floor-sections 25, that extend from side-sill to side-sill and consist of several longitudinally disposed sheet-metal plates, whose longitudinal edges are flanged downward and riveted together. Between seams these plates are provided with longitudinal corrugations that extend from one transverse edge to the other and are filled by wooden strips 26. The transverse edges of this floor-section are rolled under to make tubular edges 27, and when this floor-section is resting flat upon the side-sills and center-sill, the tubular edges nearest the hopper will come under the overlapping edge of the adjacent edge of doors 18 and 20, as stated.

When it is desired to convert the car into a dump-car, the end of floor-section 25, next the end of the car, is raised, and when it is in the desired inclined position to shed its load into the hopper, the end next the end of the car is supported in any suitable manner, either by temporary braces or struts underneath, or by hooks above, or by any other means, that will keep it in contact with the end of the body of the car.

The operation of this invention will be readily understood from the foregoing description, but it is desired to add that any of the details of its structure may be changed or modified according to the exigencies and requirements of orders that may be obtained for these cars. All such changes or modifications are considered as coming within the scope of this invention.

What is claimed as new is:—

1. A car of the kind specified, comprising an underframe, and trucks supporting the same, hoppers carried by said underframe and located on each side of the transverse center of the car between said trucks, transverse doors for closing the mouths of said hoppers, doors closing the discharge openings of said hoppers and longitudinally tiltable floor-sections extending from the end walls of the car to and over the adjacent edges of the hoppers and upon which said transverse hopper doors are supported.

2. A car of the kind specified, comprising an underframe, and trucks supporting the same, hoppers carried by said underframe and located on each side of the transverse center of the car, between said trucks, a series of transverse doors on each side of the car for closing the mouths of said hoppers, doors closing the discharge openings of said hoppers and longitudinally tiltable floor-sections extending from the end walls of the car to and over the adjacent edges of the hoppers and upon which said transverse hopper doors are supported.

3. A car of the kind specified, comprising an underframe, and trucks supporting the same, corresponding alining hoppers carried by said underframe, and located on each side of the transverse center of the car between said trucks, transverse doors for closing the mouths of said hoppers, doors closing the discharge openings of said hoppers and longitudinally tiltable floor-sections extending from the end walls of the car to and over the adjacent edges of the hoppers and upon which said transverse hopper doors are supported.

4. A car of the kind specified, comprising an underframe, and trucks supporting the same, corresponding alining hoppers carried by said underframe, and located on each side of the transverse center of the car between said trucks, a series of transverse doors on each side of the car for closing the mouths of said hoppers, doors closing the discharge openings of said hoppers, and longitudinally tiltable floor-sections extending from the end walls of the car to and over the adjacent edges of the hoppers and upon which said transverse hopper doors are supported.

5. A car of the kind specified, comprising an underframe, consisting of end-sills, side-sills, center-sill and bolsters, alining hoppers arranged on each side of said center-sill between said bolsters, transverse doors for closing the mouths of said hoppers, doors closing the discharge openings of said hoppers and longitudinally tiltable floor-sections extending from the end walls of the car to and over the adjacent edges of the hoppers and upon which said transverse hopper doors are supported.

6. A car of the kind specified, comprising an underframe, consisting of end-sills, side-sills, center-sill and bolsters, alining hoppers arranged on each side of said center-sill between said bolsters, a series of three transverse doors, the longitudinal edges of which over-lap the center-sill, and the transverse edges of the central door of which lap over the contiguous edges of the other doors when closed over the mouths of said hoppers, doors closing the discharge openings of the same, and longitudinally tiltable floor-sections extending from the end walls of the car to and over the adjacent edges of the hoppers and upon which said transverse hopper doors are supported.

7. A car of the kind specified, comprising an underframe, consisting of end-sills, side-sills, center-sill and bolsters, alining hoppers arranged on each side of said center-sill between said bolsters, transverse sheet-metal doors, the transverse edges of which are tubular, for closing the mouths of said hoppers, doors closing the discharge openings of said hoppers, and longitudinally tiltable floor-sections extending from the end walls of the car to and over the adjacent edges of the hoppers and upon which said transverse hopper doors are supported.

8. A car of the kind specified, comprising an underframe, consisting of end-sills, side-sills, center-sill and bolsters, alining hoppers arranged on each side of said center-sill between said bolsters, sheet-metal doors for closing the mouths of said hoppers, having longitudinal corrugations, and having the transverse edges thereof rolled into a tubular form, wooden strips seated in said corrugations, and longitudinally tiltable floor-sections between said hoppers and the ends of the car.

9. A car of the kind specified, comprising an underframe, consisting of end-sills, side-sills, center-sill and bolsters, alining hoppers arranged on each side of said center-sill between said bolsters, bearing-blocks secured upon said side-sills, a series of doors, the hinged edges of which are seated in said bearing-blocks for closing the mouths of said hoppers, doors closing the discharge openings of the same, and longitudinally tiltable floor-sections extending from the end walls of the car to and over the adjacent edges of the hoppers and upon which said transverse hopper doors are supported.

10. A car of the kind specified, comprising an underframe consisting of end-sills, side-sills, a single center-sill and bolsters, alining hoppers arranged on each side of said center-sill, between said bolsters, a cap-plate covering said single center-sill between the transverse planes of the ends of said hoppers farthest from each other, having its side-edges flanged upward, transverse doors having one of their longitudinal edges hinged to the sides of the car and having their opposite longitudinal edges lap over said flanges when the doors are closed over the mouths of said hoppers, doors closing the discharge openings of the same, and tiltable floor-sections extending from the end walls of the car to and over the adjacent edges of the hoppers and upon which said transverse hopper doors are supported.

11. A car of the kind specified, comprising an underframe consisting of end-sills, side-sills, a single center-sill and bolsters, alining hoppers arranged on each side of said center-sill, between said bolster, a cap-plate covering said single-center-sill between the transverse planes of the ends of said hoppers farthest from each other, having its side-edges flanged upward and between said flanges provided with a longitudinal central plateau, transverse doors having one of their longitudinal edges hinged to the sides of the car and having their opposite longitudinal edges lap over said flanges onto said plateau when the doors are closed over the mouths of said hoppers, and sagged downward, or guttered between said flanges and plateau, doors closing the discharge openings of the hoppers and tiltable floor-sections extending from the end walls of the car to and over the adjacent edges of the hoppers and upon which said transverse hopper doors are supported.

12. A car of the kind specified, comprising an underframe, consisting of end-sills, side-sills, center-sill and bolster, alining sheet-metal hoppers arranged on each side of said center-sill between said bolsters, having a long sloping bottom extending from the ends nearest the bolsters toward the center of the car, and a short inclined bottom at their opposite ends, the lower edges of which terminate above that of the longer sloped bottom portion, doors closing the discharge openings of said hoppers, vertically disposed side-walls, a cap-plate covering said center-sills between the farthest ends of said hoppers, having upwardly flanged longitudinal edges to which the upper edges of the inner side-walls of said hoppers are secured, transverse doors for closing the mouths of said hoppers, and tiltable floor-sections extending from the end walls of the car to and over the adjacent edges of the hoppers and upon which said transverse hopper doors are supported.

13. A car of the kind specified, comprising an underframe, and trucks supporting the same, hoppers carried by the underframe and located on each side of the center of the car between said trucks, and transverse doors, having reinforced edges, means for stiffening the same, and longitudinally tiltable floor-sections extending from the end walls of the car to and over the adjacent edges of the hoppers and upon which said transverse hopper doors are supported.

14. A car of the kind specified, comprising an underframe, and trucks supporting the same, hoppers carried by said underframe and located on each side of the transverse center of the car, between said trucks, transverse doors for closing the mouths of said hoppers, doors closing the discharge openings of the same and longitudinally tiltable floor-sections extending from the end walls of the car to and over the adjacent edges of the hoppers and upon which said transverse hopper doors are supported.

15. A car of the kind specified, comprising an underframe, and trucks supporting the same, hoppers carried by said underframe and located on each side of the transverse center of the car between said trucks, transverse doors for closing the mouths of said hoppers, and longitudinally tiltable floor-sections between said hoppers and the ends of the car, having transverse edges rolled into tubular form, a suitable filler for said edges, and means for stiffening said floor sections.

16. A car of the kind specified, comprising an underframe, and trucks supporting the same, hoppers carried by said underframe, and located on each side of the transverse center of the car between said trucks, transverse doors for closing the mouths of said hoppers, and longitudinally tiltable floor-sections between said hoppers and the ends of the car, having transverse edges rolled into tubular form, and provided with longitudinal corrugations, a metallic filler inserted in said tubular edges, and wooden-strips seated and secured in said corrugations.

17. A convertible car, comprising end-sills, side-sills, a center-sill, bolsters, and I-beam needle-beams extending from side-sill to side-sill, and having their upper flanges inclined, two pairs of alining opposed hoppers having downwardly inclined bottoms that rest upon and are supported by the inclined flanges of said needle-beams, vertically disposed side-walls, floor-sections, and doors closing the discharge openings of said hoppers.

18. A car of the kind specified, comprising an underframe, hoppers carried thereby, a floor for said car adapted to cover over said hoppers consisting of transversely closing doors and longitudinally inclinable floor-sections, said doors and sections having longitudinal corrugations therein, and timbers seated in said corrugations.

19. A car of the kind specified, comprising an underframe, hoppers carried thereby, a floor for said car adapted to cover over said hoppers and consisting of transversely closing doors and longitudinally inclinable floor-sections having overlapping edges and extending from the end walls of the car to and over the adjacent edges of the hoppers and upon which said doors are supported.

20. A car of the kind specified, comprising an underframe, hoppers carried thereby, a floor for said car adapted to cover over said hoppers and consisting of transversely closing doors and longitudinally inclinable floor-sections having overlapping edges, and having longitudinal corrugations therein, and timbers seated in said corrugations.

Signed at Bettendorf, Scott county, Iowa, October 17th 1910.

JOSEPH W. BETTENDORF,
*Administrator of the estate of William P. Bettendorf, deceased.*

Witnesses:
A. B. FRENIER,
HENRY BELLINGHAUSEN.